Aug. 31, 1965 G. TRAUTWEIN 3,204,189

ERROR DETECTING SYSTEM FOR PULSE COMMUNICATION SYSTEMS

Filed Sept. 19, 1962 2 Sheets-Sheet 1

INVENTOR
GUSTAV TRAUTWEIN

BY [signature]
ATTORNEY

ERROR DETECTING SYSTEM FOR PULSE COMMUNICATION SYSTEMS

Filed Sept. 19, 1962 2 Sheets-Sheet 2

INVENTOR
GUSTAV TRAUTWEIN

BY Percy P. Lantzy
ATTORNEY

United States Patent Office 3,204,189

Patented Aug. 31, 1965

3,204,189
ERROR DETECTING SYSTEM FOR PULSE COMMUNICATION SYSTEMS

Gustav Trautwein, Pforzheim, Germany, assignor to International Standard Electric Corporation, New York, N.Y., a corporation of Delaware Filed Sept. 19, 1962, Ser. No. 224,643
Claims priority, application Germany, Oct. 4, 1961, St 18,394
8 Claims. (Cl. 328—120)

This invention relates to pulse communication systems and more particularly to a system for detecting errors in the pulse signal conveying information (a pulse telegram) which may be used in electronic remote-control and data transmission systems or the like.

In the field of pulse transmission, the identification of a certain message (report or control instruction) is effected by the insertion of a predetermined pulse sequence, such as pulses of different widths, that is, a long pulse and a subsequently following long interval, into the pulse telegram. In order to avoid faulty signal transmissions, it is necessary to check the pulse telegrams with respect to their correctness before they are finally evaluated.

An object of the present invention is to provide an electronic system to detect the presence or absence of errors in pulse telegrams composed of one or more identification signals (a long pulse and a long interval) and to release an output signal in the case of faulty pulse telegrams in which a long pulse is not followed by a long interval (or vice versa).

A feature of the present invention is the provision of means coupled to a source of pulse signal including a predetermined pulse sequence to provide an output signal indicative of the presence or absence of an error in the pulse signal, means coupled to the source to generate a control signal indicative of the presence or absence of the predetermined pulse sequence and means coupled to the means to provide and the means to generate responsive to the control signal to control the operation of the means to provide.

Another feature of the present invention is the provision of a first monostable trigger circuit coupled directly to the input signal source, a second monostable trigger circuit coupled by means of an inverter stage to the input signal source, and an output switching stage coupled by means of a differentiating circuit to the input signal source. A bistable device is coupled to be responsive to a composite signal including the input signal, the output of the inverter stage, and the differentiated output of each of the monostable circuits to produce an output signal determining the condition of the output switching stage to provide an indication of the presence or absence of an error in the input signal.

Figure 1:
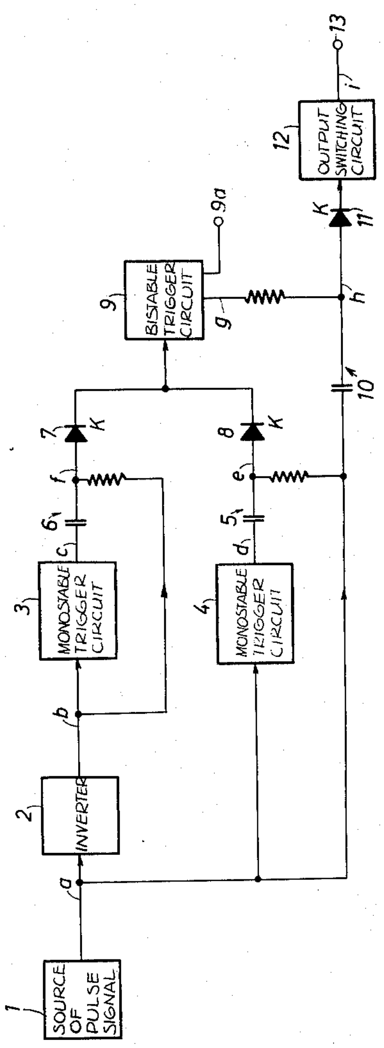
Figure 2:
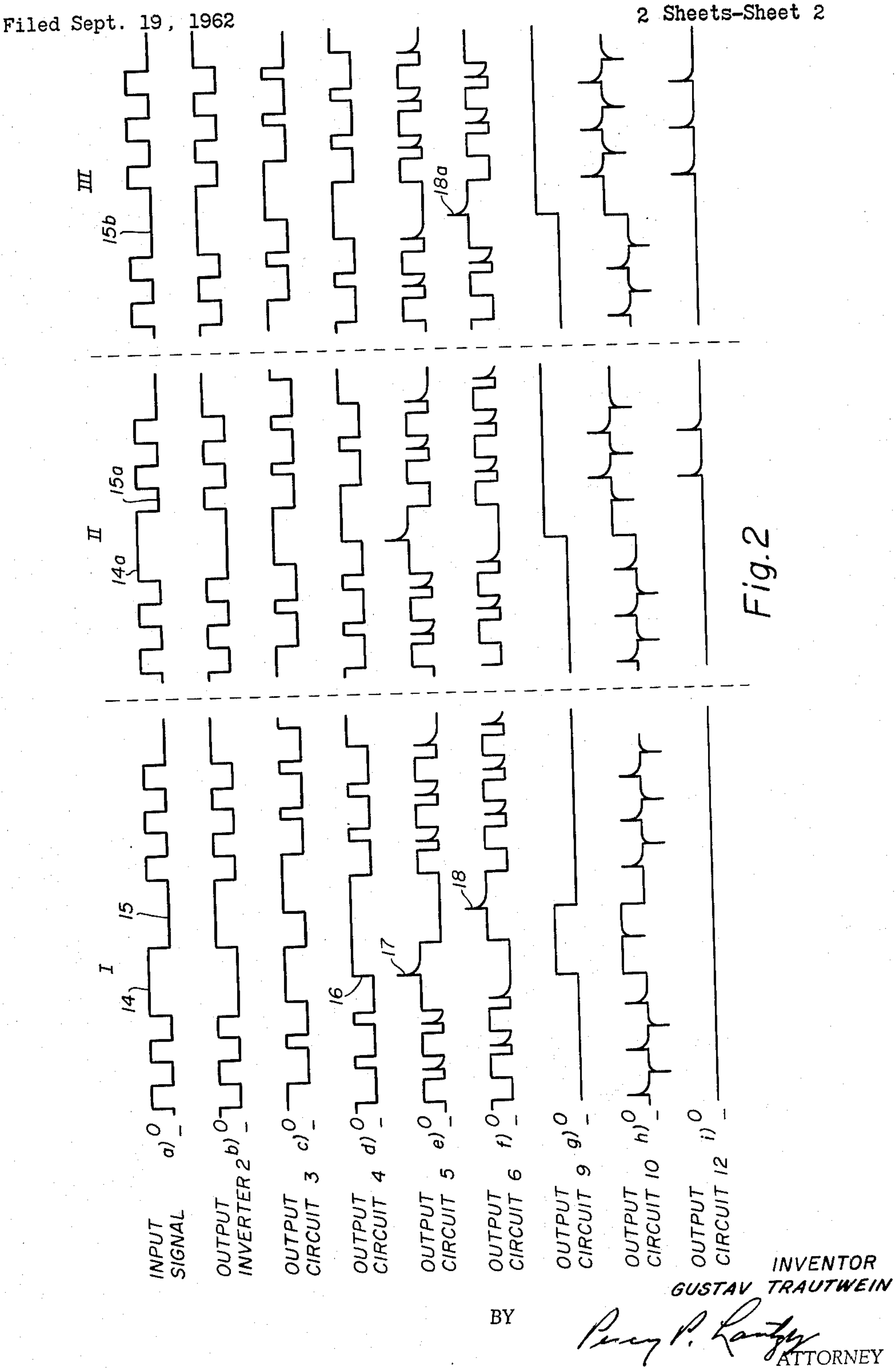

The above-mentioned and other features and objects of this invention will become more apparent by reference to the following description taken in conjunction with the accompanying drawings, in which:

FIG. 1 is a schematic diagram in block form of an error detecting system in accordance with the principles of this invention; and FIG. 2 illustrates three groups of curves, Group I no error and Groups II and III two different error conditions, useful in explaining the operation of the system of FIG. 1.

Referring to FIG. 1, the pulse telegrams (information conveying pulse signals) composed of short and long pulses, such as illustrated in curve *a*, Groups I, II and III, are applied from source 1 to inverter 2. Inverter 2 provides a 180° phase shift of the input signal as illustrated in curve *b*, Groups I, II and III, FIG. 2. This train of pulses controls a monostable trigger circuit 3 having reset time equal to 1.5 times the duration of one short pulse of the pulse signal to provide an output signal as illustrated in curve *c*, Groups I, II and III, FIG. 2.

In addition thereto, the input signal of source 1 is coupled to a second monostable trigger circuit 4 having a reset time equal to that of monostable circuit 3. Trigger circuit 4 produces an output signal having the waveform illustrated in curve *d*, Groups I, II and III, FIG. 2. The output signal of circuit 4 is differentiated and combined with the input signal of source 1 by means of RC circuit 5 producing a signal having the waveform illustrated in curve *e*, Groups I, II, and III, FIG. 2. In a similar way, the RC circuit 6 produces a signal having the waveform illustrated in curve *f*, Groups I, II, and III, FIG. 2 from the input and the output signal of circuit 3. The two signals at the output of circuits 5 and 6 are added by means of the diodes 7 and 8 and the resultant signal is a control signal used for controlling the bistable trigger circuit 9. This bistable trigger circuit 9 delivers an output voltage as illustrated in curve *g*, Groups I, II, and III, FIG. 2. The inverse output voltage is available at terminal 9*a* for other control purposes.

The RC circuit 10 combines the output signal of circuit 9 with the differentiated input signal of source 1 to form a signal as illustrated in curve *h*, Groups I, II, and III, FIG. 2 which is then fed to the output switching circuit 12 via a diode 11. Output switching circuit 12 can deliver a positive output signal (curve *i*, Groups I, II and III) at terminal 13 only if a positive pulse or potential from circuit 9 is applied to the input of circuit 12 simultaneously with a positive pulse of the differentiated input signal of source 1.

The curves of Group I, FIG. 2, illustrate the operation of the system of FIG. 1 for a correct pulse telegram, curve *a*, including, for identification purposes, the predetermined pulse sequence, a long pulse 14 and a subsequently following interval 15. If the voltage of the input signal, curve *a*, is changed from — to 0, then the voltage of the output signal of the inverter 2 (curve *b*) is changed suddenly from 0 to —. The monostable trigger circuit 3 is triggered at the beginning of the first short interval in the signal of curve *a*, or, in other words, at the beginning of the first short pulse in the signal of curve *b*. At this time the voltage of the output signal of circuit 3 will drop from 0 to — and, after the elapse of the reset time, will increase again to 0. The monostable trigger circuit 4, which is directly connected to source 1, is triggered immediately upon the arrival of the first short pulse of the input signal of curve *a* and changes its output voltage from 0 to —. Due to the delayed reset times of circuits 3 and 4, the reset pulses of circuit 4 will fall within the pulse intervals of the signal of curve *a* (note curve *e*) and the reset pulses of circuit 3 will fall into the pulse intervals of the signal of curve *b* (note curve *f*).

Upon the arrival of long pulse 14 the leading edge of this pulse will trigger circuit 4 and after the reset time the output signal of circuit 4 will change from — to 0 as indicated by leading edge 16, curve *d*. Pulse 14 will be coupled to the anode of diode 8 through the resistor of circuit 5 thereby raising the anode of diode 8 to 0 potential which when combined with the differentiated version of leading edge 16 will produce a pulse 17 which will appear at the cathode of diode 8 and actuate circuit 9 raising the potential at the output of circuit 9 from — to 0 as indicated in curve *g*. If the long pulse 14 is followed by long interval 15, the output signal of inverter 2 will trigger circuit 3 changing the voltage of this output signal from 0 to —. After the reset time of circuit 3 the voltage of the output signal is raised from — to 0 which when differentiated in circuit 6 will produce a positive pulse time coincident with this change of potential in the output signal of circuit 3. The output of inverter 2 is coupled to the anode of diode 7 through the resistor of circuit 6 thereby raising the anode of diode 7 to a potential of 0 and permitting the differentiated pulse 18 to appear at the cathode of diode 7 for application to circuit 9 which will operate to return the output of circuit 9 to —. Thus, circuit 12 will remain in a blocked condition since the requirement of having a positive potential from circuit 9 and a positive pulse from circuit 10 cannot be met. The lack of output at terminal 13 indicates the absence of an error in the pulse signal and, more particularly, indicates that there is present the predetermined pulse sequence employed for identification purposes, namely, a long pulse and a following long interval.

The curves of Group II, FIG. 2 illustrated the operation of FIG. 1 with a faulty pulse signal or telegram in which a long pulse 14*a* is followed by a short interval 15*a*. As described previously, circuit 4 in cooperation with circuit 5 and the input from source 1 will actuate circuit 9 to provide 0 potential at the output of circuit 9 as indicated in curve *g*, Group II. However, since the long pulse 14*a* is followed by a short interval 15*a*, circuit 3 and its other cooperating circuits cannot produce a pulse at the cathode of diode 7 to reset circuit 9. Thus, the positive peaks of the differentiated short pulses of the input signal (curve *a*, Group II) after the triggering of circuit 9 are passed to the output terminal 13 by the switching circuit 12. The presence of these pulses at terminal 13 indicates a faulty transmission.

Curve *a*, Group III, FIG. 2 indicates a pulse telegram containing only a long interval 15*b* and, hence, faulty in nature. The leading edge of interval 15*b* rises from — to 0 at the output of inverter 2 bringing about the triggering of circuit 3. After the reset interval the output of circuit 3 rises from — to 0. When this voltage is differentiated and added to the output of inverter 2, as illustrated in curve *f*, Group III, diode 7 can pass the pulse 18*a* which will operate to trigger circuit 9 raising the potential at the output thereof to 0. Due to the faulty predetermined pulse sequence, the absence of the long pulse, circuit 4 and its cooperating circuits cannot produce a reset pulse for circuit 9 and, hence, the positive peaks of the differentiated pulses of the input signal (curve *a*, Group III) are passed to terminal 13 by circuit 12 again indicating a faulty pulse telegram.

In accordance with the principles of this invention an error detecting system for a pulse communication system is provided comprising a source 1 of pulse signal including a predetermined pulse sequence; means, such as circuit 12, coupled to source 1 to provide an output signal indicative of the presence or absence of an error in the pulse signal; means, including inverter 2, monostable trigger circuits 3 and 4, differentiating circuits 5 and 6, and diodes 7 and 8, coupled to said source 1 to generate a control signal indicative of the presence or absence of the predetermined pulse sequence; and means, such as circuit 9, coupled to the means to provide and the means to generate responsive to the control signal to control the operation of the means to provide.

While I have described above the principles of my invention in connection with specific apparatus, it is to be clearly understood that this description is made only by way of example and not as a limitation to the scope of my invention as set forth in the objects thereof and in the accompanying claims.

I claim:

1. An error detecting system for a pulse communication system comprising:

a source of pulse signal including an information conveying pulse signal having a predetermined intermixed sequence of pulses and intervals each of a first given duration and at least one identification signal for said information conveying pulse signal having a predetermined sequence of a pulse of second given duration greater than said first duration and an interval of duration equal substantially to said second given duration;

first means coupled to said source to provide an output signal indicative of the presence or absence of an error in said pulse signal as determined by the presence or absence of said predetermined sequence of said identification signal;

second means coupled to said source to generate a control signal indicative of the presence or absence of said predetermined sequence of said identification signal; and third means coupled between said first means and said second means, said third means being responsive to said control signal to control the operation of said first means.

2. A system according to claim 1, wherein said first means includes a switching device.

3. An error detecting system for a pulse communication system comprising:

a source of information signal including as a portion thereof a predetermined pulse sequence;

first means coupled to said source to provide output signals indicative of the presence or absence of an error in said pulse signal as determined by the presence or absence of said predetermined pulse sequence;

second means coupled to said source to generate a control signal indicative of the presence or absence of said predetermined pulse sequence; and third means coupled between said first means and said second means, said third means being responsive to said control signal to control the operation of said first means;

said third means including a bistable device.

4. An error detecting system for a pulse communication system comprising:

a source of pulse information signal including as a portion thereof a predetermined pulse sequence;

first means coupled to said source to provide an output signal indicative of the presence or absence of an error in said pulse signal as determined by the presence or absence of said predetermined pulse sequence;

second means coupled to said source to generate a control signal indicative of the presence or absence of said predetermined pulse sequence; and third means coupled between said first means and said second means, said third means being responsive to said control signal to control the operation of said first means;

said second means including:

a first monostable device having a predetermined reset time coupled to said source;

a second monostable device having a reset time equal to said predetermined reset time;

an inverter coupled between said source and said second monostable device; and fourth means coupled to the output and input of each of said monostable devices to derive said control signal.

5. A system according to claim 4, wherein said fourth means includes:

a first differentiator coupled to the output of said first monostable device;

a second differentiator coupled to the output of said second monostable device;

fifth means to combine the output signal of said inverter and the output signal of said second differentiator;

sixth means to combine the output signal of said source and the output signal of said first differentiator; and seventh means to combine the output signals of said fifth and sixth means to combine to provide said control signal.

6. A system according to claim 5, wherein said predetermined reset time is equal to approximately one and a half times the duration of the shortest pulse of said pulse signal.

7. An error detecting system for a pulse communication system comprising:

a source of pulse information signal including as a portion thereof a predetermined pulse sequence;
a first monostable device coupled to said source;
an inverter coupled to said source;
a second monostable device coupled to said inverter;
a first differentiator coupled to the output of said first monostable device;
a second differentiator coupled to the output of said second monostable device;
first means coupled to said source and said first differentiator;
second means coupled to the output of said inverter and said second differentiator;
a switching device coupled to said source; and
a bistable device coupled in common to said first and second means and to said switching device to control said switching device to provide an indication of the presence or absence of an error in said pulse signal.

8. A system according to claim 7, wherein each of said monostable devices has a reset time approximately equal to one and a half times the duration of the shortest pulse of said pulse signal.

References Cited by the Examiner

UNITED STATES PATENTS 3,031,646 4/62 Reinholtz ----------- 340—146.1

OTHER REFERENCES

Hill: Variable Frequency Clock Check, IBM Technical Disclosure Bulletin, vol. 1, No. 3, October 1958, pages 19 and 20.

Jenny: IBM Technical Disclosure Bulletin, "Missing Pulse Detector," vol. 2, No. 4, December 1959, pages 66–67.

ARTHUR GAUSS, *Primary Examiner.*

MALCOLM A. MORRISON, JOHN W. HUCKERT, *Examiners.*